(12) United States Patent
Nair et al.

(10) Patent No.: US 10,021,107 B1
(45) Date of Patent: *Jul. 10, 2018

(54) METHODS AND SYSTEMS FOR MANAGING DIRECTORY INFORMATION

(71) Applicant: CITIGROUP TECHNOLOGY, INC., Weehawken, NJ (US)

(72) Inventors: Sandeep Nair, Odessa, FL (US); Jerry Speyer, Tampa, FL (US); Udaya Chandupatla, Bethpage, NY (US)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,642

(22) Filed: Dec. 4, 2016

Related U.S. Application Data

(63) Continuation of application No. 13/663,969, filed on Oct. 30, 2012, now Pat. No. 9,544,312.

(51) Int. Cl.
*H04L 29/06* (2006.01)
*H04L 29/08* (2006.01)
*H04L 29/12* (2006.01)
*G06F 15/16* (2006.01)

(52) U.S. Cl.
CPC ........ *H04L 63/105* (2013.01); *H04L 61/1523* (2013.01); *H04L 67/16* (2013.01); *H04L 67/306* (2013.01); *H04L 67/42* (2013.01)

(58) Field of Classification Search
CPC ... H04L 63/105; H04L 63/1523; H04L 67/16; H04L 67/306; H04L 67/42; H04L 61/1523

USPC .............. 709/203, 226–227; 726/5
See application file for complete search history.

(56) References Cited

U.S. PATENT DOCUMENTS

| | | |
|---|---|---|
| 5,991,882 A | 11/1999 | O'Connell |
| 6,947,989 B2 | 9/2005 | Curie et al. |
| 7,124,132 B1 | 10/2006 | Hayes et al. |
| 7,146,635 B2 | 12/2006 | Eggebraaten et al. |
| 7,185,361 B1 | 2/2007 | Ashoff et al. |
| 7,209,970 B1 | 4/2007 | Everson et al. |
| 7,240,125 B2 | 7/2007 | Fleming et al. |

(Continued)

FOREIGN PATENT DOCUMENTS

WO    2010133908 A1    11/2010

OTHER PUBLICATIONS

Final Office Action for U.S. Appl. No. 13/663,969, dated Dec. 17, 2014, 18.

(Continued)

*Primary Examiner* — David Lazaro
*Assistant Examiner* — Zi Ye
(74) *Attorney, Agent, or Firm* — John M. Harrington, Esq.; Johnson, Marcou & Isaacs, LLC

(57) ABSTRACT

Methods and systems for managing directory information, such as onboarding a LDAP server, employing a processor coupled to memory and other computer hardware and software components for receiving a request related to one or more applications from a requestor in pre-determined business logic, acknowledging the request by an approver function without requiring the requestor to negotiate, for example, with an LDAP administrator to justify the request, and provisioning the request into the enterprise LDAP server in the pre-determined business logic.

20 Claims, 4 Drawing Sheets

| Field | Description |
|---|---|
| locationcode | Location Code of individual's workplace |
| expensecode | Chargeback Code |
| payrollcode | Payroll Code |
| departmentname | Name of individual's department |
| deptmgrgeid | The GEID of the individual's manager |
| soeid | Standard Operating Environment Identifier |
| country | Country abbreviation of Location |
| fciid | Financial Consultant ID. |
| GOC Code | Global Organization code |
| City | City of work location |
| State | State of work location |
| Building | Work location building |
| Street | Street address |
| Zipcode | Postal code of work location |

(56) References Cited

U.S. PATENT DOCUMENTS

| | | | |
|---|---|---|---|
| 7,571,180 B2 | 8/2009 | Minyailov et al. | |
| 7,761,469 B2 | 7/2010 | Rowley et al. | |
| 7,865,931 B1 | 1/2011 | Stone et al. | |
| 7,882,130 B2 | 2/2011 | Byrne et al. | |
| 7,904,474 B2 | 3/2011 | Rowley et al. | |
| 8,051,168 B1* | 11/2011 | Boysko | G06F 21/31 709/218 |
| 8,069,180 B1 | 11/2011 | Moore et al. | |
| 8,095,502 B2 | 1/2012 | Feng et al. | |
| 8,145,666 B2 | 3/2012 | Bell et al. | |
| 2002/0111942 A1 | 8/2002 | Campbell et al. | |
| 2002/0188729 A1 | 12/2002 | Zhou et al. | |
| 2002/0194045 A1* | 12/2002 | Shay | G06Q 10/06 705/7.14 |
| 2003/0078937 A1 | 4/2003 | Boreham et al. | |
| 2005/0125677 A1 | 6/2005 | Michaelides et al. | |
| 2006/0130065 A1 | 6/2006 | Chin et al. | |
| 2007/0283443 A1 | 12/2007 | McPherson et al. | |
| 2007/0289001 A1 | 12/2007 | Havercan et al. | |
| 2009/0150981 A1* | 6/2009 | Amies | H04L 63/102 726/5 |
| 2009/0210541 A1 | 8/2009 | Chandolu et al. | |
| 2010/0235897 A1 | 9/2010 | Mason et al. | |
| 2011/0016162 A1 | 1/2011 | Booth et al. | |
| 2011/0093367 A1 | 4/2011 | Stapleton et al. | |
| 2011/0197254 A1 | 8/2011 | Sallaka et al. | |
| 2012/0216243 A1 | 8/2012 | Gill et al. | |

OTHER PUBLICATIONS

Office Action for U.S. Appl. No. 13/663,969, dated Dec. 8, 2015, 19.
International Search Report and Written Opinion for PCT/US2013/052625, dated Feb. 7, 2014, 13.
Office Action for U.S. Appl. No. 13/663,969, dated Apr. 10, 2015, 17.
Final Office Action for U.S. Appl. No. 13/663,969, dated Apr. 19, 2016, 24.
Office Action for U.S. Appl. No. 13/663,969, dated Aug. 14, 2014, 16.
Final Office Action for U.S. Appl. No. 13/663,969, dated Aug. 3, 2015, 21.
bluecoat.com, et al., "Technical Brief: LDAP Authentication and Authorization", BlueCoat.com, 2008, 11.
ip.com, et al., "Method and System for Defining Relationships between LDAP Attributes in a LDAP Directory Server", IP.com Prior Art Database, Dec. 15, 2010, 1-2.
Yin, et al., "A PERMIS-Based Authorization Solution between Portliest and Back-End Web Services", International Workshop on Grid Computing Environments, Nov. 12, 2006, 1-10.

* cited by examiner

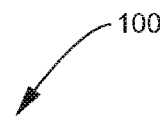

| Field | Description |
|---|---|
| locationcode | Location Code of individual's workplace |
| expensecode | Chargeback Code |
| payrollcode | Payroll Code |
| departmentname | Name of individual's department |
| deptmgrgeid | The GEID of the individual's manager |
| soeid | Standard Operating Environment Identifier |
| country | Country abbreviation of Location |
| fciid | Financial Consultant ID. |
| GOC Code | Global Organization code |
| City | City of work location |
| State | State of work location |
| Building | Work location building |
| Street | Street address |
| Zipcode | Postal code of work location |

Fig. 1

METHODS AND SYSTEMS FOR MANAGING DIRECTORY INFORMATION

CROSS REFERENCE TO RELATED APPLICATIONS

This application claims priority to and is a continuation of co-pending U.S. patent application Ser. No. 13/663,969 filed Oct. 30, 2012, entitled "Methods and Systems for Managing Directory Information", the entire contents of which are hereby expressly incorporated herein by this reference including, without limitation, the specification, claims, and abstract, as well as any figures, tables, or drawings thereof.

FIELD OF THE INVENTION

The present invention relates generally to the field of directory services, and more particularly to methods and systems for managing directory information.

BACKGROUND OF THE INVENTION

Traditionally, the function of extending an application directory schema, which typically involves adding and/or defining attributes, was exclusively an administrative function. Such administrative functions take a considerable amount of time to perform, and most application owners are not current app experts. Further, while the application owners know the business want these authorization attributes, they do not want to be concerned with how it is being done. Currently, the process requires a discussion or negotiation between an administrator and the application owner with a considerable amount of justification that is cumbersome and time-consuming and leads to costly delays.

There is a present need for methods and systems for managing directory information that address and overcome the problems of existing implementations and allow operational personnel to approve requests without lengthy negotiations with administrators.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods and systems for managing directory information described herein.

Embodiments of the invention provide methods and systems for managing directory information including, for example, onboarding an enterprise Lightweight Director Access Protocol (LDAP) server that may involve receiving, using a processor coupled to memory, a request related to at least one application from a requestor in pre-determined business logic; acknowledging the request by an approver function likewise using the processor; and provisioning the request into the enterprise LDAP server in the pre-determined business logic also using the processor.

In aspects of embodiments of the invention, receiving the request may involve, for example, receiving the request to provision an attribute for authorization to access the at least one application. In other aspects, receiving the request may involve, for example, receiving the request from a user to provision the user's own attribute for authorization to access the at least one application. In further aspects, receiving the request to provision the attribute for authorization may involve, for example, receiving the request to provision an attribute defining a user within the attribute. In additional aspects, receiving the request to provision the attribute defining a user may involve, for example, receiving the request to provision a string type attribute defining the user within the attribute.

In other aspects of embodiments of the invention, receiving the request in pre-determined business logic may involve, for example, translating the request into LDAP logic. In additional aspects, receiving the request may involve, for example, receiving the request on form fields displayed by a web-based internal application of an enterprise. In further aspects, receiving the request may involve, for example, receiving the request for at least one of delegating or removing an application owner, creating or deleting a function identifier (ID), creating a custom attribute, granting or revoking functional ID access to a custom attribute, creating or deleting a dynamic LDAP group, assigning a dynamic group administrator, and adding or removing a member from a dynamic LDAP group. In additional aspects, receiving the request may involve, for example, receiving the request for at least one of managing functional ID Internet Protocol (IP) address restriction, functional ID password reset, manage enterprise entitlement review system (EERS) feed, and update functional ID contact mail address.

In further aspects of embodiments of the invention, acknowledging the request may involve, for example, acknowledging the request by at least one of an application owner, an enterprise LDAP owner, a single sign-on (SSO) owner, and an enterprise LDAP group administrator. In still further aspects, acknowledging the request may involve, for example, acknowledging all requests by the application owner. In other aspects, acknowledging the request may involve, for example, reviewing the request and acknowledging the request in a pre-determined automated sequence. In still other aspects, acknowledging the request in the pre-determined automated sequence may involve, for example, approving the request without requiring justification of a need for the request.

In additional aspects of embodiments of the invention, approving the request may involve, for example, sending the request to a queue for the approver function. In other aspects, provisioning the request may involve, for example, creating an application role as an attribute. In further aspects, provisioning the request may involve, for example, granting functional ID access for the application on an application role attribute. In still further aspects, provisioning the request may involve, for example, defining an application role attribute as a LDAP group. In still other aspects, provisioning the request may involve, for example, performing lookups using a LDAP logic translation of the pre-determined business logic.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 1 is a table that illustrates examples of attributes that are not presently available via existing single sign-on (SSO)

Figure 2:
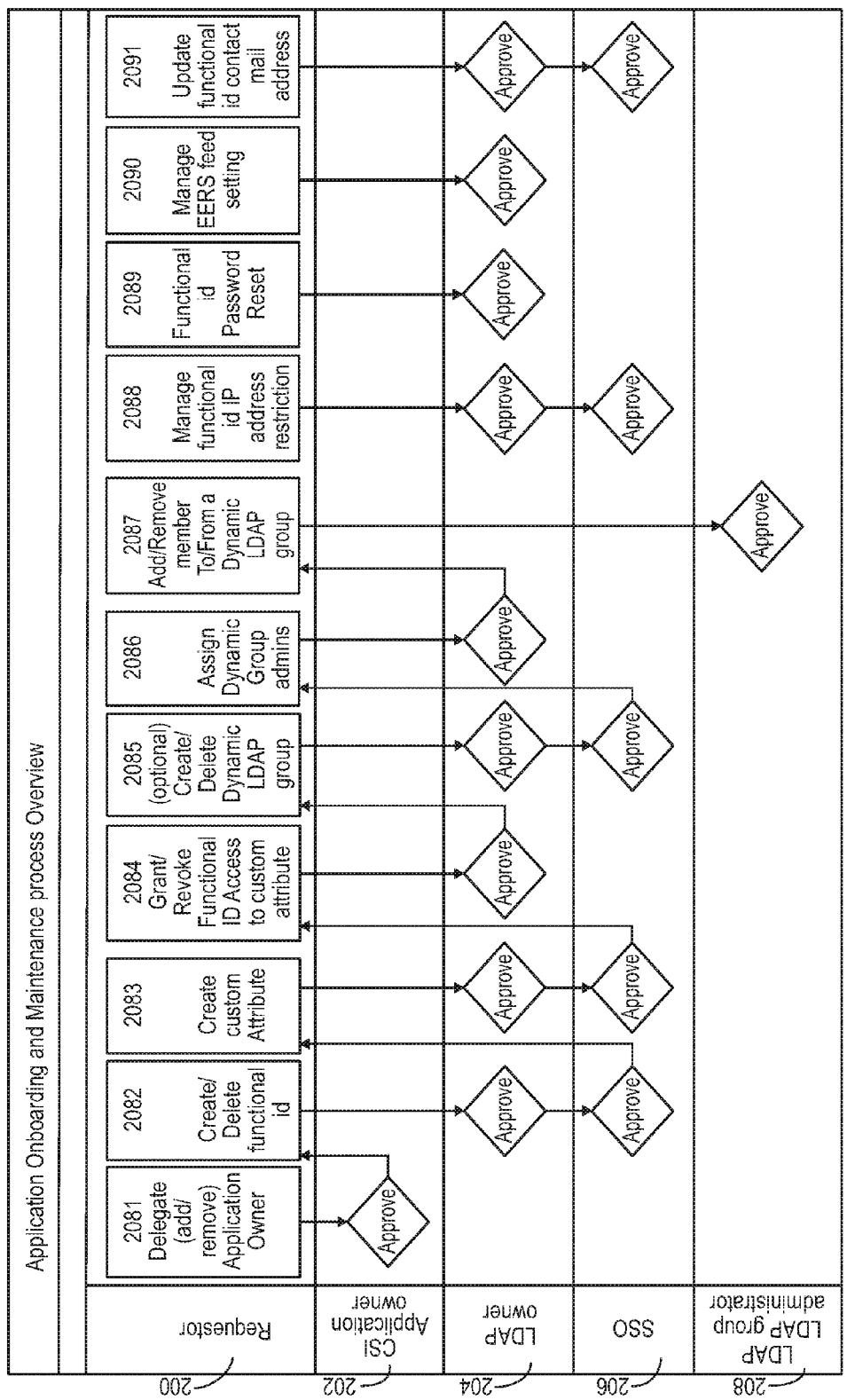
Figure 3:
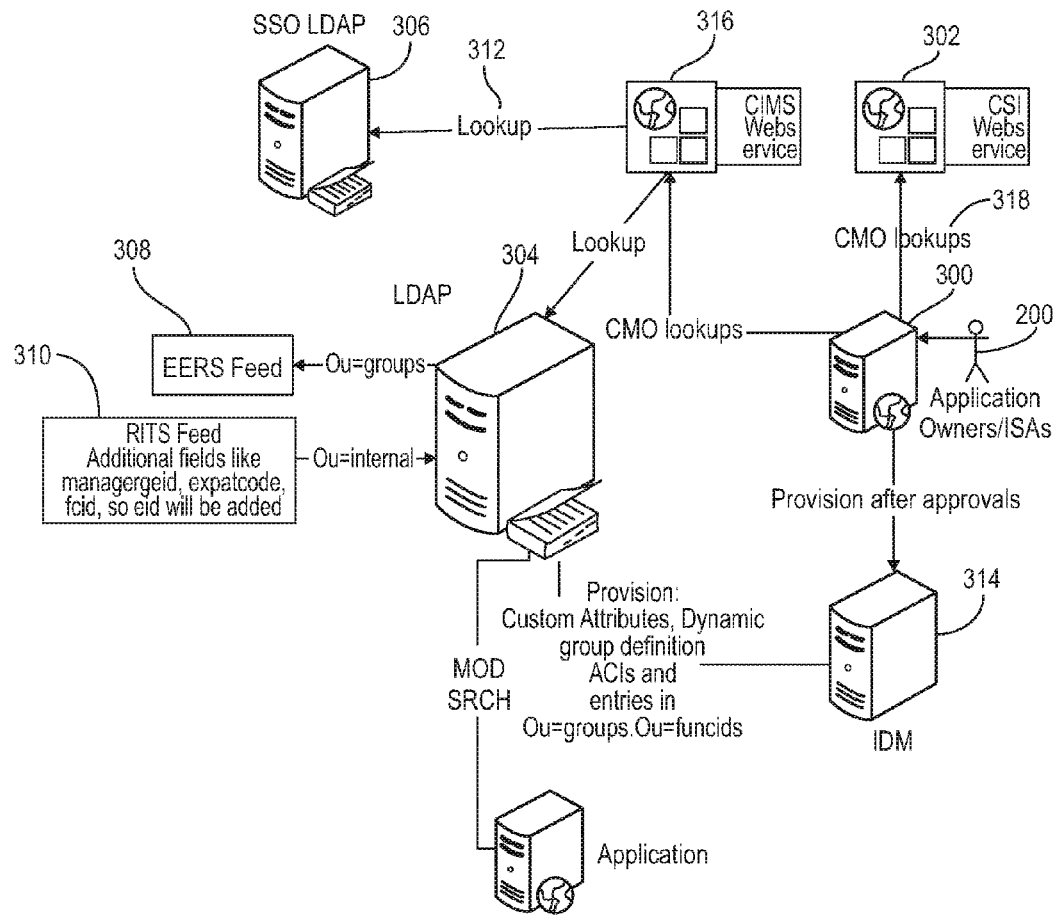
Figure 4:
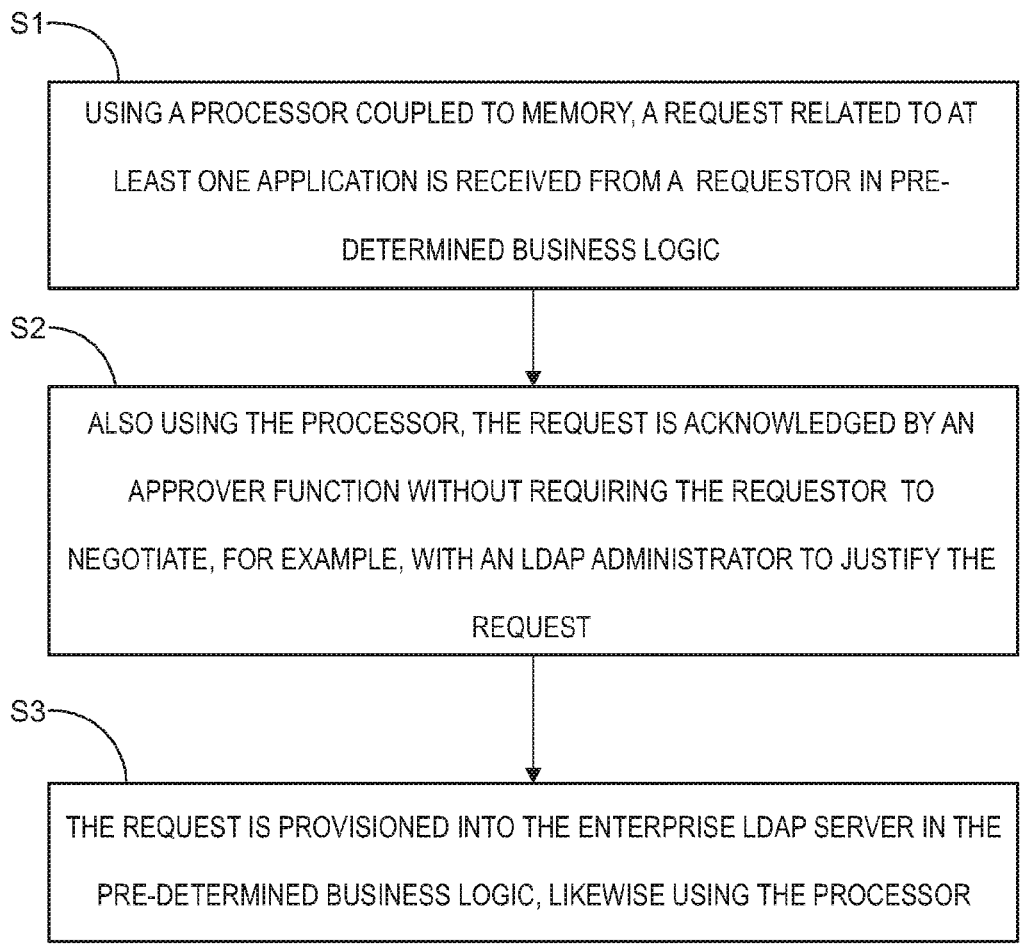

Lightweight Directory Assistance Protocol (LDAP) services that are made available by embodiments of the invention;

FIG. 2 is a flow chart that illustrates an overview example of the process of onboarding and maintaining applications from an application owner's perspective for embodiments of the invention;

FIG. 3 is a schematic diagram which illustrates an overview example of components and the flow of information between components for embodiments of the invention; and FIG. 4 is a flow chart that illustrates an example of the process of onboarding an enterprise LDAP server according to embodiments of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide methods and systems for managing directory information that enables application owners, who are typically also the end users of an application, to provision their own attributes for authorization purposes. FIG. 1 is a table 100 that illustrates examples of attributes that are not presently available via existing single sign-on (SSO) Lightweight Directory Assistance Protocol (LDAP) services and which are made available by embodiments of the invention. Typically, such attributes may be string type attributes wherein, for example, a particular user may be defined within the attribute. For example, a user profile may have an attribute called "role" for which the value may be set as "admin", which means that the user is an administrator of some type. Embodiments of the invention enable the owner of an application who understands his or her business and also understands the user's role, in turn, to translate that understanding into LDAP and provision it for a particular application.

FIG. 2 is a flow chart that illustrates an overview example of the process of onboarding and maintaining applications from an application owner's perspective for embodiments of the invention. FIG. 3 is a schematic diagram which illustrates an overview example of components and the flow of information between components for embodiments of the invention. Referring to FIGS. 2 and 3, the process may follow a sequence executed on an internal application 300 of the enterprise. As a brief overview of the functionality of such an internal application 300, within an enterprise, every service or product may be ordered through the internal application 300. The internal application 300 may include, for example, various forms and involve workflows that allow users to order from the application in a manner somewhat similar to an e-commerce form. Thus, a user may order a service or product which is then submitted for approval and after approval, the product or service is delivered.

Referring to FIG. 2, embodiments of the invention may involve a number of roles within the LDAP service of the enterprise. Such roles may include, for example, a requestor 200, a systems inventory application owner 202, an enterprise LDAP owner 204, a single sign-on (SSO) owner 206, and an enterprise LDAP group administrator 208. Referring to FIG. 3, it is noted that a systems inventory server 302 may store all application details for the enterprise. Thus, the systems inventory server 302 may be a repository of the enterprise with which all of its applications are registered.

Referring further to FIGS. 2 and 3, assume, for example, that an application owner 202 wants to define rules for the application, referred to herein as app rules. In order to accomplish this, the application owner 202 may log in as a requestor 200 to the internal application 300 for embodiments of the invention. Generally, the application manager 202 is in charge of an enterprise systems inventory application. The application manager 202, as the requestor 200, may recognize, for example, that he or she may not be available at a particular time and that it would not be good to interrupt a process of the application because of such unavailability. Thus, at 2081, the app owner 202 may assign his or her delegates.

Once that is done, the requestor 200, who may be the application owner 202 or someone else, may request a functional ID with the enterprise LDAP server 304. Any system application user or other person who needs to connect to the enterprise LDAP 304 must prove or authenticate himself or herself to the LDAP 304 in order to obtain the connection. The user's functional ID may be used to make the LDAP server 304 aware of the user's entitlement to access. Applications may use a functional ID to connect to the LDAP server 304 in order, for example, to enter a modification or query.

Referring again to FIGS. 2 and 3, at 2082, the application owner as requestor 200 may create a functional ID for the application with the enterprise LDAP server 304. Form fields for the create functional ID process at 2082 may include, for example, functional ID identifier, application support group mail alias, justification, additional comments, and a reason for the request. It is to be understood that instead of requiring the requestor 200 to provide an administrator a justification in the sense of proving a need, for example, to create the functional ID, it is only necessary for the requestor 200 to provide the reason for requesting the creation of the functional ID.

Approval of the functional ID creation may be performed by the enterprise LDAP owner 204 and the SSO team 206, which is an operational team. It is to be further understood that the approval is automated, so that when a request is received, it is only necessary for the approver to review and approve the request. There is no need for the requestor 200 to negotiate, for example, with an administrator, because the process is a predetermined, automated process in which a request is simply reviewed. If everything appears to be in order, the request is approved. Thus, it is not necessary, for example, for someone to return to the LDAP server behind the scenes and run customized commands and the like.

Referring further to FIGS. 2 and 3, after the functional ID is created, at 2083, the requestor 200 may request, for example, the creation of a custom attribute, such as "app role". Accordingly, after the approval, an "app role" may be created as the attribute. Form fields for the process to the custom attribute may include, for example, application ID, attribute identifier, derived attribute name, attribute alias, attribute option, reason for the request, and additional comments. Once the attribute is created, at 2084, functional ID access to the customer attribute may be granted or revoked. After creating the functional ID at 2082 and creating the custom attribute at 2083, they may be bound together at 2084. At 2084, access may be granted to the functional ID on the attribute, and access may likewise be revoked. Thus, an application owner as requestor 200 has complete control over determining which functional IDs can update attributes, and if the application owner judges that someone should not have access, that person's access may be revoked. In the past, granting and revoking functional ID access to attributes required the application owner to call up, for example, the administrator or first level support personnel and channel such grant or revocation through one of those entities, which was extremely time consuming.

Referring once more to FIGS. 2 and 3, as noted above, after the attribute is created at 2083, it may be necessary to bind the attribute providing, in effect, that a functional ID for the application has complete access over the particular attribute, "app role" at 2084. Thus, no other application may be allowed to update the particular attribute. For this purpose, form fields for the grant access to functional ID process may include blanks for entry, for example, of application ID, attribute, to whom the application ID functional ID belongs, functional ID, access type, whether the access (ACI) already exists, whether the LDAP service is required to have IP based restrictions for the particular functional ID, acknowledgements, source IP restriction, reason for the request, and additional comments. It is to be understood that granting functional ID access to the custom attribute at 2084 is complex on the backend because many things must be managed. For example, access control information (ACI's) must be designed. Such ACI's may consist of access control lists which tell the LDAP server 304 which functional IDs and other IDs have what type or types of access within the LDAP service. Thus, after approval, at 2084, functional ID access may be granted for the particular application on the "app role" attribute.

Referring also to FIGS. 2 and 3, at 2085, the "app role" attribute may be defined as a LDAP group. This means, for example, that anyone who has "app role" equals "admin" would fall under an admin group, and anyone who has "app role" equals "user" would fall under a user group. Form fields for the create dynamic LDAP group may include, for example, application ID, attribute name, attribute value, dynamic group name, does this LDAP already exist in the enterprise LDAP server 304, does the application own the chosen LDAP group name in the enterprise SSO LDAP server 306, is an enterprise entitlement review system EERS feed 308 required and related fields, reason for the request, and additional comments. In addition, at 2086, administrators may be added who will represent the application and may be allowed to add or remove people from the LDAP group or from the "app role". Form fields for the assigning group administrator process may include, for example, application ID, dynamic group name, administrator user ID, test if the user ID is already an administrator, reason for the request, and additional comments. It is to be understood that the approvals referred to in each of the foregoing processes is an acknowledgment rather that a granting of permission.

Referring again to FIG. 2, additional processes for embodiments of the invention may include, for example, managing functional ID and IP address restriction 2088 by which source IP addresses from which a functional ID can connect may be restricted. Thus, an unauthorized person who acquires a functional ID and password cannot connect from a server other than via connections that have been pre-assigned and pre-approved. Form fields for the manage functional ID/IP address restriction may include, for example, attribute application ID, attribute, to whom does application ID functional ID belong, functional ID, access type, does the access (ACI) already exist, ACI, current IP address restriction, new IP address restriction, new ACI, acknowledgements, reason for the request, and additional comments. Another process may involve functional ID password reset 2089, so that someone who needs to reset a password may accomplish this as well. At the same time, an enterprise paradigm may require a review of all accesses that everyone at the enterprise may have. Form fields for the functional ID password reset process may include, for example, application ID, functional ID, password, reason for the request, and additional comments. Using an EERS feed setting process 2090, applications may also be allowed to opt in or out of a feeder process in which the type or types of access a particular person or user profile is fed to an (EERS) 308. In an update functional ID contact mail address process 2091, primarily for operational purposes, contacts may be set, for example, if system maintenance or a system upgrade is being performed about which a contact address may be needed.

It is to be noted that the foregoing processes are illustrated from a high level point of view of an app owner or application. It is not necessary, for example, for the application to know how the LDAP service is constructed or how it works behind the scenes. In embodiments of the invention, the world of the LDAP is translated into a business world wherein the process is defined in business terms instead of LDAP terms and provisioned into the enterprise LDAP server 304.

Referring to FIG. 3 a component of the invention is the enterprise LDAP server 304 which may be characterized as a hub of the functionality for embodiments of the invention. Another component is the enterprise SSO LDAP server 306 which may be, for example, a repository of all the internal users, which may include employees as well as consultants and others who are not customers, such as consumers and business customers. The enterprise SSO LDAP server 306 stores user IDs, passwords and various profile details for such internal users. A function of the enterprise SSO LDAP server 306 is to enable single sign-on in which a user may access multiple applications using the same user ID and password. Thus, all enterprise applications point to a web access management (WAM) tool, which is in turn coupled to the enterprise SSO LDAP server 306. The enterprise SSO LDAP server 306 may be characterized as a type of authentication system, although it is not intended to function as a full-fledged authorization system in which an application can connect directly into whatever resource it needs or wants. However, the enterprise SSO LDAP server 306 was designed and functions as an authentication system that stores user ID's and passwords for all the users in the enterprise that perform single sign-on. Embodiments of the invention involve a solution in which the enterprise LDAP server 304 provides the authorization information. The enterprise LDAP server 304 not only provides the authorization information but also manages the information on its own. Thus, it is not necessary for enterprise applications to ask any of the enterprise support teams, administrative teams, engineering teams or operations teams to do anything specific for them.

Referring further to FIG. 3, other components for embodiments of the invention include, for example, EERS feed 308 and RITS feed 310 which initialize the enterprise LDAP server 304. The EERS feed 308 and RITS feed 310 serve as sources populated from the human resources (HR) system within the enterprise LDAP server 304. For example, the RITS feed 310 receives its files from the HR system and feeds all the user details into the enterprise LDAP server 304 for embodiments of the invention. A reason for having a lookup 312 into the enterprise SSO LDAP server 306 is to avoid a situation in which a group or role may have already been defined in the enterprise SSO LDAP server 306. Apart from that issue, the system for embodiments of the invention is literally independent.

Referring still further to FIG. 3, as previously mentioned, embodiments of the invention include within the enterprise an internal application 300 through which every service or product may be ordered. An application owner or application admin may login to the internal application 300, which is a web-based application, and invoke all of the products previously discussed herein, including without limitation, the functionality for creating attributes and ACIs, associating attributes and functional ID's, and all the other steps in order to manage a dynamic LDAP group. The enterprise identity management (IDM) service 314 functions somewhat as a backend for the enterprise internal application 300. Thus, the enterprise internal application asset 300 functions as a workflow engine, and the IDM service 314 functions as a provisioning engine. Once an approval is made, the process goes to the enterprise identity management (IDM) service 314 and in turn to the enterprise LDAP server 304 and performs the provisioning previously defined within the IDM system 314, such as custom attributes, dynamic group definition ACI's, and entries in functional ID's.

Referring again to FIG. 3, the CIMS web services 316 provides information, for example, to look up user profiles, ACIs, and dynamic groups which are defined to enable enterprise internal application lookups, because a significant number of lookups occur within the workflow. Embodiments of the invention ensure that when lookups are performed, the business logic remains intact and all that is being done is translating the lookups into LDAP requirements. Thus, a considerable portion of the functions for embodiments of the invention goes into the CIMS search service 316 and also the IDM service 314 where much of the translation occurs. That also forms a part of the backend for embodiments of the invention, because it enables applications to be independent. Other components, such as the enterprise systems inventory 302, where details of all enterprise applications are stored, are provided primarily for looking up application details. In embodiments of the invention, an application manager delegates to an application owner within the enterprise LDAP server 304, so a preliminary action is using an enterprise systems inventory to perform a look-up 318 and to identify the application manager, because that is the only person who is entitled to approve system requests. Once the application manager assigns a delegate, the system for embodiments of the invention becomes practically self-sustaining. Further, that is done only once in the lifecycle of the application at the initiation of a project.

Again referring to FIGS. 2 and 3, as previously noted, the requestor 200 may be the application owner 202 or any enterprise employee other than the application owner. The application owner 202 is identified by using the enterprise inventory system look-up 318. While any enterprise employee may be a requestor 200, the application owner 202 must approve any action requested. In embodiments of the invention, the application owner 202 is the person or role who would typically log in to the enterprise internal application 300. However, any of the roles defined in FIG. 2, such as the requestor 200 or the approver roles may log in to the enterprise internal application 300. At 2081, the application owner 202 is looked up on the enterprise systems inventory 302 prior to approval. At the same time, the enterprise internal application 300 has the relevant forms, and after an approval, the process proceeds to the enterprise IDM server 314, which creates the delegates. At 2082, wherein functional ID's are created, a similar model is followed. Thus, a user logs into the enterprise internal application 300 and fills in a form, after which the process proceeds to the enterprise IDM server 314 and is provisioned into the enterprise LDAP server 304, and the process is iterated several times from 2081 through 2086.

Additional processes which do not follow a particular sequence include, for example, manage functional ID IP address restriction 2088, functional ID password reset 2089, manage EERS feed setting 2090, and update functional ID contact mail address 2091. While not performed in any particular order, the process of each of those functions follows a similar model.

In embodiments of the invention, the components involved in any invocation of the process include, for example, the enterprise internal application 300, the enterprise IDM server 314, and the enterprise LDAP server 304 using the CIMS search service 316 and the CSI service 302. In each case, a user may be provided with a form which helps the user, for example, with looking up values, details of applications, details of attributes, functional ID's, and LDAP groups.

In the past, the onboarding process required negotiations with and approval by an administrator in which the application owner or representative of the application owner called up the SSO team or the LDAP team and asked to create an attribute. In response, the owner or representative was asked to provide a justification for the requested attribute. In addition, the owner or representative was asked to describe the kind of attributes being requested and the number of such attributes. Again, the owner or representative was required to justify a need for the number of attributes. Thereafter, it was necessary to log on the LDAP server and run several commands, for example, to first create an attribute in the schema and then to create ACIs. It is self-apparent that such process was a burdensome administrative task which required the administrator to take time to create files in which the ACI's were defined to restrict access to a functional ID and attribute. Even after all that was done, testing on development was required, in which development staging for a cycle was required to be followed. The process was entirely manual and without standards and required an inordinate amount of time.

FIG. 4 is a flow chart that illustrates an example of the process of onboarding an enterprise LDAP server according to embodiments of the invention which overcome those problems and allow operational personnel to approve requests without lengthy negotiations with administrators. Referring to FIG. 4, at S1, using a processor coupled to memory, a request related to at least one application is received from a requestor in pre-determined business logic. At S2, also using the processor, the request is acknowledged by an approver function without requiring the requestor to negotiate, for example, with an LDAP administrator to justify the request. As S3, the request is provisioned into the enterprise LDAP server in the pre-determined business logic, likewise using the processor.

Another feature of embodiments of the invention is standardization of all the processes involved, for example, by naming conventions. With embodiments of the invention, when a need arises for a role to be created, it can be done immediately. The only possible delay is for approvals which are required to maintain checks and balances, but the business and the infrastructure teams know what is being requested. The requests are immediately approved, and everything else occurs behind the scenes. The approvals are manual only in a sense that once a request is placed, it goes into the queues of the approvers. When a request goes into the queue of an approver, the approver simply makes the approval, and thereafter, the process is entirely automated. The approval is actually a notification to the approver and acknowledgement by the approver to assure the all of the approvers know that an action has been taken.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method of onboarding an enterprise Lightweight Directory Access Protocol (LDAP) server, comprising:
   receiving, by a processor coupled to memory, without involvement of an administrator, from a non-administrator end user who is an application owner of at least one enterprise application responsible for objectives of the at least one enterprise application, a request and a reason for the request, in pre-determined business logic, to create a functional identifier (ID) with the enterprise LDAP server and to provision the application owner's own application role custom attribute for authorization allowing the application owner functional identifier (ID) access for at least modification or query of the at least one enterprise application on the application owner's own custom attribute into the LDAP server;
   creating, by the processor, based solely on the reason for the request and without involvement of the administrator, said requested functional identifier (ID) with the enterprise LDAP server; and
   provisioning, by the processor, based solely on the reason for the request and without involvement of the administrator, said requested application owner's application role custom attribute for authorization allowing the application owner functional identifier (ID) access for at least modification or query of the at least one enterprise application on the application owner's own custom attribute into the enterprise LDAP server.

2. The method of claim 1, wherein receiving the request to provision the application owner's own application role custom attribute further comprises receiving the request to provision the application owner's application role string type custom attribute defining the non-administrator end user within the attribute without involvement of the administrator.

3. The method of claim 1, wherein receiving the request in pre-determined business logic further comprises translating the request into LDAP logic without involvement of the administrator.

4. The method of claim 1, wherein receiving the request further comprises receiving the request on form fields displayed by a web-based internal application of the at least one enterprise without involvement of the administrator.

5. The method of claim 1, further comprising receiving, by the processor, without involvement of the administrator, from the non-administrator end user, a request and a reason for the request, in pre-determined business logic, for at least one of creating or deleting a dynamic LDAP group, assigning a dynamic group administrator, and adding or removing a member from a dynamic LDAP group, and granting the request without involvement of the administrator.

6. The method of claim 1, further comprising receiving, by the processor, without involvement of the administrator, from the non-administrator end user, a request and a reason for the request, in pre-determined business logic, for at least one of managing functional identifier (ID) Internet Protocol (IP) address restriction, functional ID password reset, manage enterprise entitlement review system (EERS) feed, and update functional ID contact mail address, and granting the request without involvement of the administrator.

7. The method of claim 1, further comprising generating, by the processor, a notification and acknowledgement of the request by at least one of an enterprise LDAP owner and a single sign-on (SSO) owner without involvement of the administrator.

8. The method of claim 7, wherein generating the notification and acknowledgement of the request further comprises reviewing the request and acknowledging the request in a pre-determined automated sequence without involvement of the administrator.

9. The method of claim 8, wherein acknowledging the request in the pre-determined automated sequence further comprises approving the request without requiring justification of a need for the request and without involvement of the administrator.

10. The method of claim 9, wherein approving the request further comprises sending the request to an approver function queue without involvement of the administrator.

11. The method of claim 1, further comprising allowing, by the processor, the application owner functional identifier (ID) access for at least modification or query of the at least one enterprise application on the application owner's own custom attribute into the enterprise LDAP server without involvement of the administrator.

12. The method of claim 1, further comprising performing, by the processor, lookups using a LDAP logic translation of pre-determined business logic without involvement of the administrator.

13. A system for onboarding an enterprise Lightweight Directory Access Protocol (LDAP) server, comprising:
a processor coupled to memory, wherein the processor is programmed to:
receive, without involvement of an administrator, from a non-administrator end user who is an application owner of at least one enterprise application responsible for objectives of the at least one enterprise application, a request and a reason for the request, in pre-determined business logic, to create a functional identifier (ID) with the enterprise LDAP server and to provision the application owner's own application role custom attribute for authorization allowing the application owner functional identifier (ID) access for at least modification or query of the at least one enterprise application on the application owner's own custom attribute into the enterprise LDAP server;
create, based solely on the reason for the request and without involvement of the administrator, said requested functional identifier (ID) with the enterprise LDAP server; and
provision, based solely on the reason for the request and without involvement of the administrator, said requested application owner's application role custom attribute for authorization allowing the application owner functional identifier (ID) access for at least modification or query of the at least one enterprise application on the application owner's own custom attribute into the enterprise LDAP server.

14. The system of claim 13, wherein the processor is further programmed to receive the request to provision the application owner's own application role string type custom attribute defining the non-administrator end user within the attribute without involvement of the administrator.

15. The system of claim 13, wherein the processor is further programmed to translate the request into LDAP logic without involvement of the administrator.

16. The system of claim 13, wherein the processor is further programmed to receive the request on form fields displayed by a web-based internal application of the at least one enterprise without involvement of the administrator.

17. The method of claim 13, wherein the processor is further programmed to receive, without involvement of the administrator, from the non-administrator end user, a request and a reason for the request, in pre-determined business logic, for at least one of creating or deleting a dynamic LDAP group, assigning a dynamic group administrator, and adding or removing a member from a dynamic LDAP group, and to grant the request without involvement of the administrator.

18. The method of claim 13, wherein the processor is further programmed to receive, by the processor, without involvement of the administrator, from the non-administrator end user, a request and a reason for the request, in pre-determined business logic, for at least one of managing functional identifier (ID) Internet Protocol (IP) address restriction, functional ID password reset, manage enterprise entitlement review system (EERS) feed, and update functional ID contact mail address, and to grant the request without involvement of the administrator.

19. The method of claim 13, wherein the processor is further programmed to generate a notification and acknowledgement of the request by at least one of an enterprise LDAP owner and a single sign-on (SSO) owner without involvement of the administrator.

20. The method of claim 13, wherein the processor is further programmed to allow the application owner functional identifier (ID) access for at least modification or query of the at least one enterprise application on the application owner's own custom attribute into the enterprise LDAP server without involvement of the administrator.

* * * * *